US012099318B2

(12) United States Patent
Kuroda et al.

(10) Patent No.: US 12,099,318 B2
(45) Date of Patent: Sep. 24, 2024

(54) IMAGE FORMING APPARATUS INCLUDING A CIRCUMFERENTIAL ROTATION UNIT

(71) Applicant: FUJIFILM Business Innovation Corp., Tokyo (JP)

(72) Inventors: Mitsuaki Kuroda, Kanagawa (JP); Shohei Miyagawa, Kanagawa (JP); Naoya Kamigaito, Kanagawa (JP); Atsuna Saiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/589,225

(22) Filed: Jan. 31, 2022

(65) Prior Publication Data

US 2023/0066533 A1 Mar. 2, 2023

(30) Foreign Application Priority Data

Aug. 25, 2021 (JP) ................................ 2021-137592

(51) Int. Cl.
*G03G 15/20* (2006.01)

(52) U.S. Cl.
CPC ................................ *G03G 15/2028* (2013.01)

(58) Field of Classification Search
CPC ................................................. G03G 15/2028
See application file for complete search history.

(56) References Cited

U.S. PATENT DOCUMENTS 8,886,104 B2 * 11/2014 Izawa ................ G03G 15/2028 399/400
2006/0056886 A1 * 3/2006 Ohishi ................... B41J 13/025 399/328
2012/0092431 A1 * 4/2012 Hara ...................... B65H 9/006 271/118

FOREIGN PATENT DOCUMENTS

JP 59-007966 A 1/1984
JP 2021-148839 A 9/2021
WO 2020/183757 A1 9/2020
WO WO-2021002109 A1 * 1/2021 ......... G03G 15/2017

OTHER PUBLICATIONS

Extended European Search Report issued Oct. 17, 2022 in European Application No. 22166229.9.

* cited by examiner

*Primary Examiner* — Victor Verbitsky
(74) *Attorney, Agent, or Firm* — Sughrue Mion, PLLC

(57) ABSTRACT

An image forming apparatus includes: a holding unit that holds a recording medium transported; a circumferential rotation unit that circumferentially rotates with the holding unit fixed, and constitutes part of a transport path along which the recording medium is transported; an image former that forms an image on the recording medium at an image formation position on a circumferential rotational path of the circumferential rotation unit; a pass point at which the recording medium is passed on the circumferential rotational path; and a receiving point which is provided on a same side as the pass point with respect to the image formation position, and at which the recording medium is received from the circumferential rotational path.

12 Claims, 11 Drawing Sheets

IMAGE FORMING APPARATUS INCLUDING A CIRCUMFERENTIAL ROTATION UNIT

CROSS-REFERENCE TO RELATED APPLICATIONS

This application is based on and claims priority under 35 USC 119 from Japanese Patent Application No. 2021-137592 filed Aug. 25, 2021.

BACKGROUND

(i) Technical Field

The present disclosure relates to an image forming apparatus.

(ii) Related Art

The transfer transport apparatus described in Japanese Unexamined Patent Application Publication No. 59-007966 is a transfer sheet transport apparatus of a recording apparatus in which a recording head having a light emitting device array and an imaging system is moved at a constant speed in a substantially bus direction of a photoconductor drum which rotates at a constant speed, the photoconductor drum is spirally scanned to form a latent image, and a toner image obtained by developing the latent image is transferred to a transfer sheet. The transfer sheet transport apparatus includes: a pair of endless chains or belts transported in a direction perpendicular to the axis of the photoconductor drum; a gripper unit that is fixed to the pair of endless chains or belts by respective pins on both ends, and transports a transfer sheet by gripping the front edge thereof; and a unit that variably controls the relative positional relationship in the transport direction of the pair of chains or belts. Before the transfer sheet is transported to a transfer position, the orientation of the gripper unit is tilted by an angle equal to the angle of the main scanning direction of spiral recording on the photoconductor drum with respect to the drum circumferential direction, thus the transfer sheet transport apparatus transports the transfer sheet with the transfer sheet tilted.

SUMMARY

Aspects of non-limiting embodiments of the present disclosure relate to providing an image forming apparatus capable of being downsized, as compared with a configuration in which the sheet feed direction and the sheet discharge direction are the same direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a holding unit that holds a recording medium transported; a circumferential rotation unit that circumferentially rotates with the holding unit fixed, and constitutes part of a transport path along which the recording medium is transported; an image former that forms an image on the recording medium at an image formation position on a circumferential rotational path of the circumferential rotation unit; a pass point at which the recording medium is passed on the circumferential rotational path; and a receiving point which is provided on a same side as the pass point with respect to the image formation position, and at which the recording medium is received from the circumferential rotational path.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
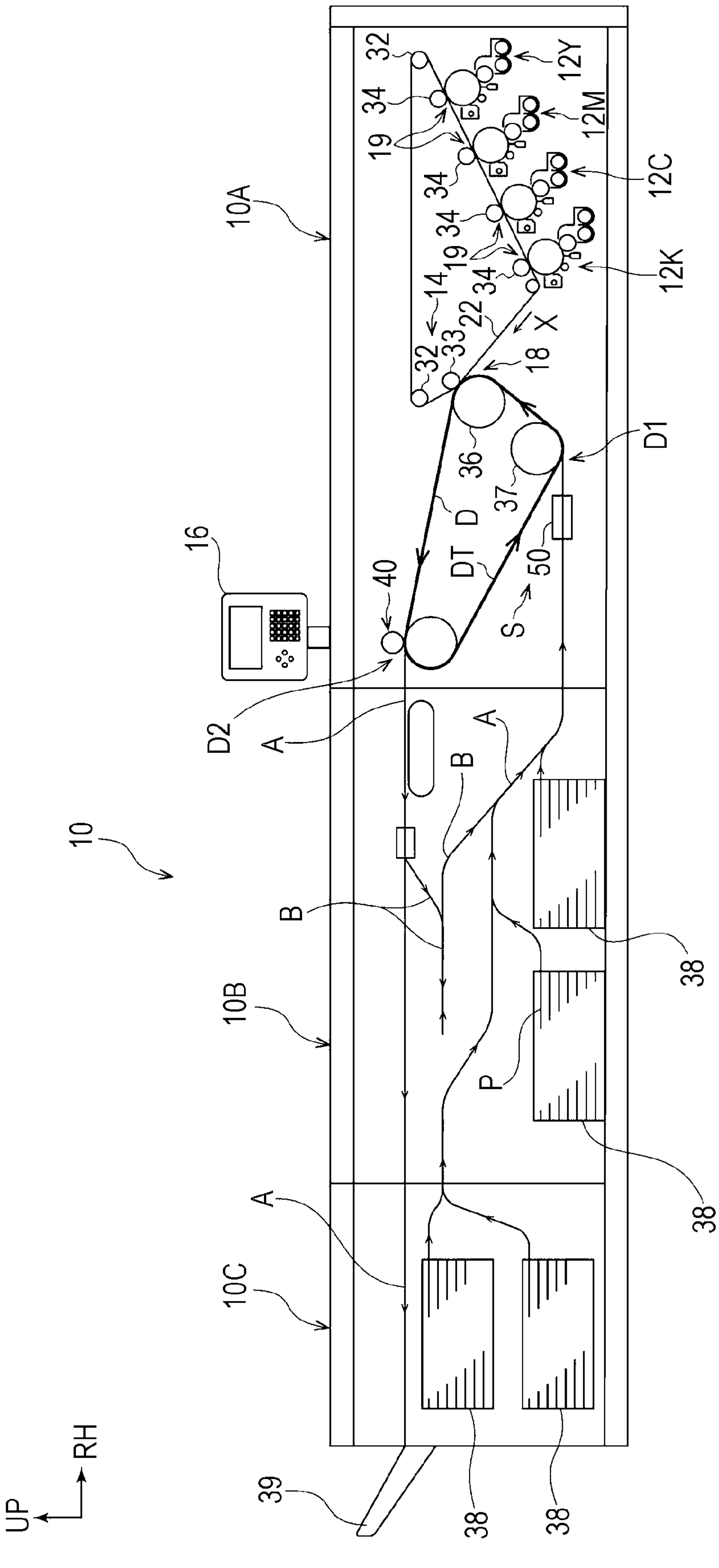
FIG. 1 is a front view illustrating an image forming apparatus according to a first exemplary embodiment.

An image forming apparatus (simply referred to as an "apparatus" as needed) according to a first exemplary embodiment of the present disclosure will be described with reference to FIGS. 1 to 13. Note that an arrow UP illustrated in the drawings is a vertical direction which indicates the apparatus upper direction. In addition, as illustrated in FIG. 1, an arrow RH is a horizontal direction which indicates the rightward when facing the apparatus. When the up and down direction is specified without an assumption in the following description, the direction indicates the up and down direction of the apparatus illustrated in FIG. 1. When the right and left direction is specified without an assumption in the following description, the direction indicates the right (=R) or the left (=L) direction when facing the apparatus illustrated in FIG. 1. In addition, when the depth direction (=near and far) is specified without an assumption in the following description, the direction indicates the depth direction when facing the apparatus illustrated in FIG. 1.

Overall Configuration of Image Forming Apparatus 10

First, the configuration of the image forming apparatus 10 will be described. FIG. 1 is a front view illustrating the outline of the image forming apparatus 10 according to the exemplary embodiment.

As illustrated in FIG. 1, the image forming apparatus 10 includes: a unit 10A disposed on the right side of FIG. 1; a unit 10B disposed on the left side of the unit 10A in FIG. 1; and a unit 10C disposed on the left side of the unit 10B in FIG. 1. The unit 10B and the unit 10C store sheets of paper P (=correspond to an example of a recording medium) for image recording, and include sheet trays 38 that supply sheets of paper P to the unit A. In addition, the unit 10C includes a sheet discharge tray 39. The unit 10A includes an image former that forms an image on the sheet of paper P. The image former includes an image forming unit 12 to form an image by an electrophotographic system, an intermediate transfer belt 22 to carry an image formed, and an intermediate transfer unit 14 to be mounted on and support the intermediate transfer belt 22. In addition, the image forming apparatus 10 is provided with a transfer body 36 on the lower left side of the intermediate transfer unit 14, the transfer body 36 being configured to transfer an image from the intermediate transfer unit 14 to the sheet of paper P.

The contact section between the intermediate transfer belt 22 and the transfer body 36 is the later-described second transfer position 18 (=corresponds to an example of an image formation position). At the second transfer position 18, a toner image formed by the image forming unit 12 is transferred to the front surface of the sheet of paper P via the intermediate transfer belt 22 mounted on the intermediate transfer unit 14.

The image forming apparatus 10 includes multiple image forming units 12 for respectively forming toner images of each color. In the exemplary embodiment, a total of four image forming units corresponding to respective colors are provided: a yellow image forming unit 12Y, a magenta image forming unit 12M, a cyan image forming unit 12C, and a black image forming unit 12K.

Here, in the exemplary embodiment, yellow (=Y), magenta (=M), cyan (=C), and black (=K) are basic colors for outputting color images. In the following description, when the colors of the image forming units 12 do not need to be distinguished, each image forming unit 12 is simply referred to as an "image forming unit 12", and a description is given with the symbols of Y, M, C and K omitted as appropriate, each of which represents an image forming unit of a corresponding color.

Figure 2:
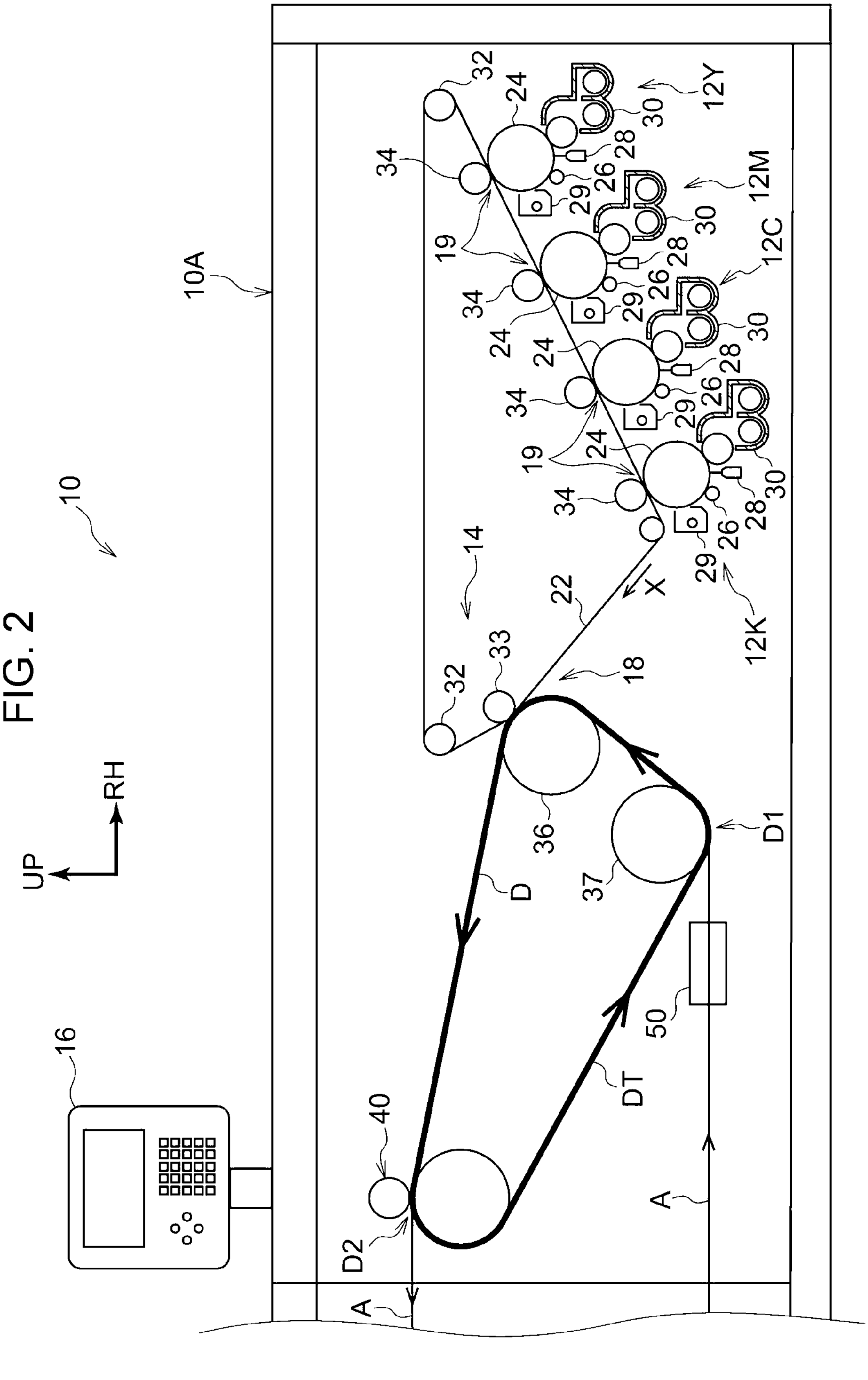
FIG. 2 is an enlarged view around an image formation position in the image forming apparatus according to the first exemplary embodiment.

The toner image former 20 of each color basically has a similar configuration except for the type of toner. As illustrated in FIG. 2, each image forming unit 12 includes a cylindrical photoconductor 24 which rotates, and a charger 26 that charges the photoconductor 24. In addition, the image forming unit 12 includes an exposure device 28 that radiates light for exposure to the charged photoconductor 24 to form an electrostatic latent image; and a developing device 30 that develops the electrostatic latent image with a developer containing toner, as an image formed with toner. In addition, a cleaner 29 is provided to remove the remaining toner on the front surface of the photoconductor 24 after toner is transferred from the photoconductor 24 to the intermediate transfer belt 22.

The photoconductor 24 of each color is configured to come into contact with the outer circumferential surface of the intermediate transfer belt 22. In addition, as illustrated in FIG. 1, the image forming units 12 corresponding to yellow, magenta, cyan, black are disposed side by side from the upstream side to the downstream side in the circumferential rotation direction (=the direction of arrow X in FIG. 1) of the intermediate transfer belt 22.

Intermediate Transfer Unit 14

The intermediate transfer unit 14 includes first transfer rolls 34 disposed to be opposed to respective image forming units 12 of each color; and a back-up roll 33 disposed to be opposed to the transfer body 36. The details of the transfer body 36 will be described below.

Intermediate Transfer Belt 22

As illustrated in FIG. 1, the intermediate transfer belt 22 is formed in an endless shape. The intermediate transfer belt 22 is wound on multiple rolls 32 to have its posture fixed. In the exemplary embodiment, the posture of the intermediate transfer belt 22 is an approximately obtuse triangular shape which is long in the apparatus width direction in a front view, and has a projecting obtuse angle downward. Of the multiple rolls 32, one roll which is not illustrated has a function of rotating the intermediate transfer belt 22 in the direction of arrow X by power of a motor which is not illustrated. The intermediate transfer belt 22 is rotated in the direction of the arrow X, thereby transporting a first transferred image to the later-described second transfer position 18.

The intermediate transfer belt 22 is configured to be circumferentially rotatable in the direction of the arrow X with being in contact with or away from the photoconductor 24 of each color.

First Transfer

As illustrated in FIG. 1, each first transfer unit 19 is formed by a contact section between a corresponding photoconductor 24, intermediate transfer belt 22, and first transfer roll 34. The first transfer roll 34 is disposed to be opposed to the photoconductor 24 with the intermediate transfer belt 22 interposed therebetween. The first transfer roll 34 and the intermediate transfer belt 22 are configured to be in contact with each other with a predetermined load.

In addition, a voltage is applied to the first transfer roll 34 by a power supply unit which is not illustrated. The voltage is called a first transfer voltage for first transferring a toner image formed on the photoconductor 24 to the intermediate transfer belt 22 between the photoconductor 24 and the first transfer roll 34.

Transfer Body

As illustrated in FIG. 1, the transfer body 36 is provided at a position opposed to the back-up roll 33 with the intermediate transfer belt 22 interposed therebetween. The transfer body 36 has a cylindrical shape having an axial direction in the depth direction of the image forming apparatus 10, and is provided rotatably in a circumferential direction. In the outer circumference of the transfer body 36, a recess (not illustrated) is formed into which the later-described gripper 42 is fitted.

A voltage is applied to the transfer body 36 by a power supply unit which is not illustrated. The voltage is called a second transfer voltage when toner images superimposed and transferred on the intermediate transfer belt 22 are second transferred to a sheet of paper P which has been transported to the second transfer position 18.

Second Transfer

As illustrated in FIG. 1, the second transfer position 18 (=corresponds to an example of an image formation position) is determined by the contact point between the intermediate transfer belt 22 and the transfer body 36 formed in a roll shape. The intermediate transfer belt 22 is configured to be in contact with the transfer body 36 with a predetermined load by the back-up roll 33 disposed to be opposed to the transfer body 36.

Fixing Device

A fixing device 40 is disposed downstream of the second transfer position 18 in the transport direction of the sheet of paper P. The fixing device 40 is comprised of a pair of rolls which are opposed to each other. The pair of rolls are installed to be opposed to each other with the later-described sheet transport path A interposed therebetween. In other words, the sheet of paper P as a fixing target is transported so as to pass between the pair of rolls.

Sheet Transport Path

As illustrated in FIG. 1, a sheet transport path A (=an example of a transport path) has a function of transporting a sheet of paper P to the unit 10A, the sheet of paper P being supplied from the sheet trays 38 of the unit 10B or the unit 10C. In addition, the sheet transport path A is configured to allow the sheet of paper P supplied from the sheet trays 38 to be transported, while being passed through the secondary transfer position 18 and the fixing position (the details will be described below) in the unit 10A, and to be discharged to the sheet discharge tray 39 of the unit 10C through the unit 10B.

On the other hand, part of the sheet transport path A downstream of the fixing device 40 is branched to a direction change path B for changing the transport direction of the sheet of paper P. The direction change path B has a function of changing the transport direction of a sheet of paper P to the direction opposite to the transport direction of the sheet transport path A downstream of the fixing device 40, the sheet of paper P being transported to the direction change path B branched from the sheet transport path A. In other words, the direction change path B has a function of reversing the relationship between the front edge and the rear edge of a sheet of paper P by changing the transport direction of the sheet of paper P transported to the direction change path B, and allowing the sheet of paper P to be transported downstream in the transport direction of the direction change path B. Part of the direction change path B downstream in the transport direction is configured to be merged into the sheet transport path A which leads to the second transfer position 18. The path between the direction change path B and a circumferential path D (the details will be described below) on the sheet transport path A is called a merge path where the transport path for the front surface of the sheet of paper P and the transport path for the rear surface are merged. Note that each transport path mentioned above includes multiple rolls for sheet transport which are not illustrated. The sheet of paper P is transported along each transport path by these rolls.

Image Forming Operation for Basic Image

Next, an overview of the image forming operation for the sheet of paper P in the image forming apparatus 10 will be described.

Various types of operations in the image forming apparatus 10 are performed by a controller 16 (see FIG. 1) built in the apparatus. Upon receiving an image forming command from the outside, the controller 16 causes each image forming unit 12 to operate. The photoconductor 24 of each color is charged by the charger 26 while being rotated. In addition, the controller 16 transmits image data which has undergone image processing in an image signal processor (its illustration is omitted) to each exposure device 28. The exposure device 28 radiates exposure light to a corresponding photoconductor 24 according to the image data, thereby exposing the charged photoconductor 24 to the light. Thus, an electrostatic latent image is formed on the outer circumferential surface of the photoconductor 24. The electrostatic latent image formed on the photoconductor 24 is developed by a corresponding developing device 30, and a toner image of each color is formed on the photoconductor 24 corresponding to the color.

A toner image of each color formed on a corresponding photoconductor 24 of the color is first transferred to the intermediate transfer belt 22 by the first transfer roll 34 of the color. At this time, due to the circumferential rotation of the intermediate transfer belt 22, toner images of respective colors are successively first transferred to the intermediate transfer belt 22 while being superimposed. The toner images superimposed in this manner are transported to the second transfer position 18 by the circumferential rotation of the intermediate transfer belt 22. The superimposed toner images are then transferred from the intermediate transfer belt 22 to the sheet of paper P at the second transfer position 18.

The sheet of paper P with the second transferred toner images is transported to the fixing device 40. The sheet of paper P is heated and pressurized by a fixing roll in the fixing device 40. Consequently, the toner images formed by the image forming units 12 are fixed to the sheet of paper P.

Note that the image forming apparatus 10 has the direction change path B, thereby making it possible to perform duplex printing on the sheet of paper P. The details of the duplex printing in the image forming apparatus 10 will be described later.

Configuration of Principal Components

Next, the principal components of the exemplary embodiment will be described.

Gripper

Figure 3:
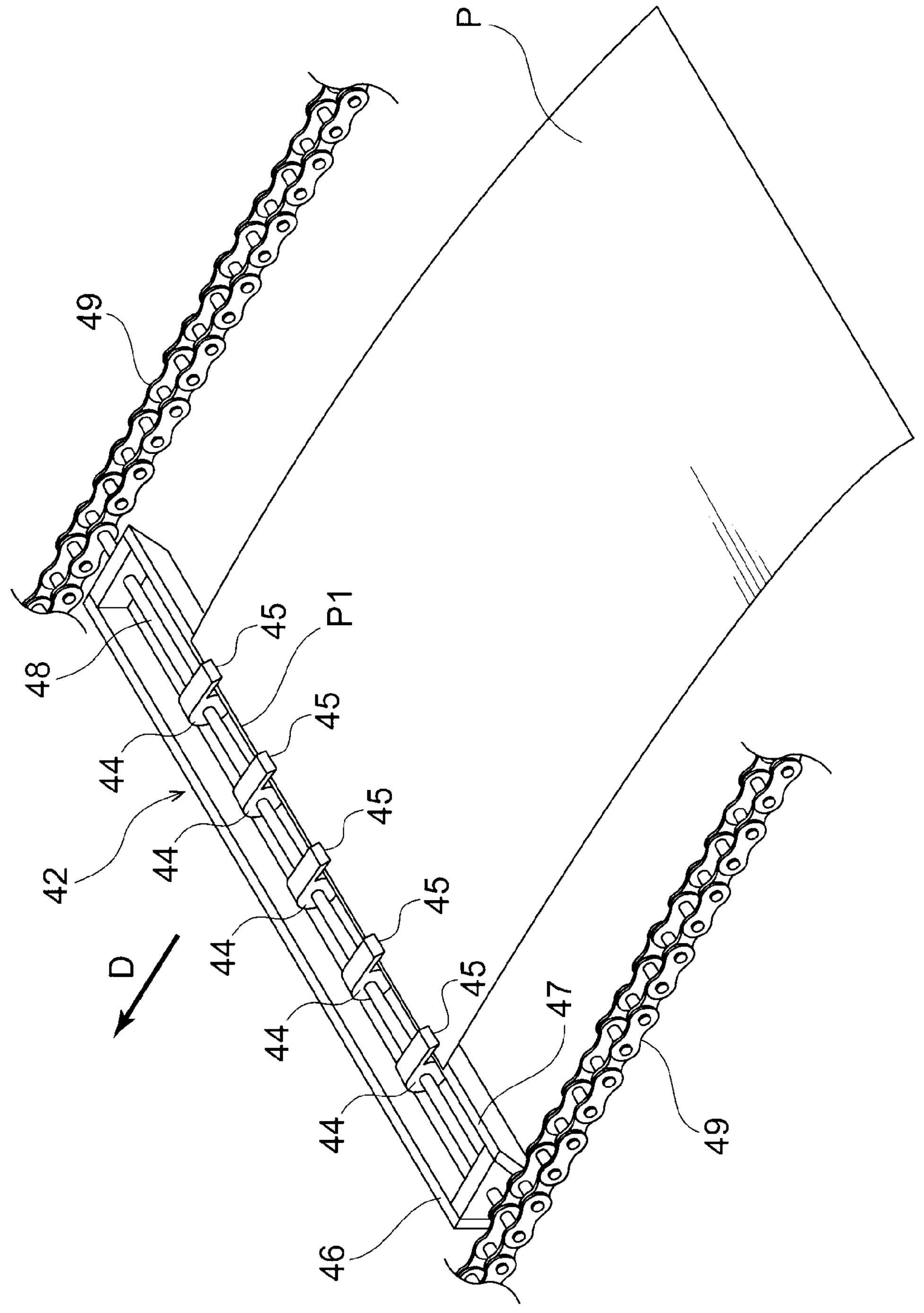
FIG. 3 is an enlarged view illustrating a state of sheet holding by a gripper in the image forming apparatus according to the first exemplary embodiment.
Figure 4B:
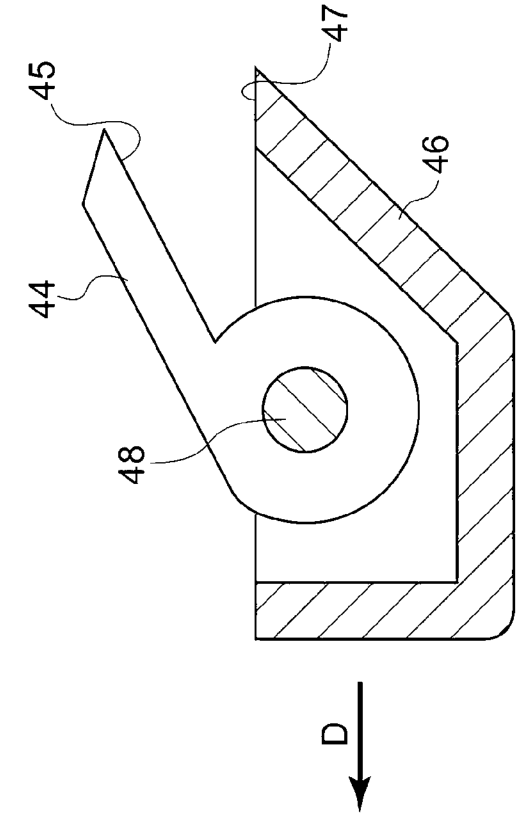
FIGS. 4A and 4B are cross-sectional views each illustrating an operation of the gripper in the image forming apparatus according to the first exemplary embodiment.
Figure 4A:
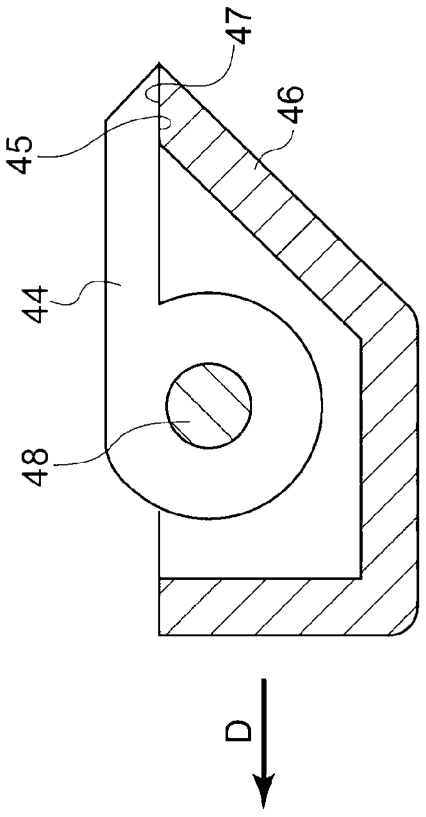

As illustrated in FIG. 3, the image forming apparatus 10 includes a gripper 42 (=corresponds to an example of a holding unit) that holds the front edge P1 of the transported sheet of paper P to assist the transport of the sheet of paper. Th gripper 42 includes clips 44, a rectangular case 46 that covers the clips 44, and a shaft 48 that extends in the depth direction.

Multiple clips 44 are provided along the depth direction of the apparatus. In addition, the clips 44 are configured to be fixed to the shaft 48, and rotatable along with the rotation of the shaft 48 in a circumferential direction.

The case 46 has a longitudinal direction in the depth direction, and is held by the shaft 48. In addition, the case 46 is configured to rotate independently from the rotation of the clips 44. Furthermore, the case 46 is configured to cover the upstream and downstream sides in two directions of the clips 44 in the sheet transport direction, and the side in the back surface direction (in other words, the direction to a non-image formation surface of the sheet of paper P) of the sheet of paper. In this structure, front edges 45 of the clips 44 and a rear end 47 of the case 46 are configured to hold the front edge P1 of the sheet of paper P in the transport direction.

Shaft and Transport Chain

As illustrated in FIG. 3, both ends of the shaft 48 of the gripper 42 in the depth direction are held by the later-described transport chains 49 (=corresponds to an example of a circumferential rotation unit). In other words, the transport chains 49 are mounted on the both ends of the gripper 42 in the depth direction. The shaft 48 of the gripper 42 is held by the transport chains 49 so as to circumferentially rotate along with the transport chains 49 in conjunction with the circumferential rotation of the transport chains 49. Thus, the gripper 42 is held by the transport chains 49 provided on the near side and the far side of the image forming apparatus 10, and is circumferentially rotated along a predetermined circumferential rotational path D (see FIG. 1). The transport chains 49 are a pair of endless-shaped chains held by multiple sprockets (not illustrated) along the circumferential rotational path D.

Circumferential Rotational Path D

Here, as illustrated in FIG. 1, the circumferential rotational path D is provided so that part of the sheet transport path A overlaps with part of the circumferential rotational path D in a front view of the image forming apparatus 10. In the exemplary embodiment, the posture of the circumferential rotational path D is an approximately triangular shape which is long in the apparatus width direction in a front view, and has a projection downward. Specifically, the circumferential rotational path D is formed so as to overlap with the sheet transport path A in a range from a contact point with the sheet transport path A on the outer circumference of a sprocket 37 provided below the transfer body 36 to the point passing the fixing device 40. Note that the position at which the fixing device 40 is passed by the circumferential rotational path D is called a fixing position (=corresponds to an example of a fixing position).

At the start point of overlap between the sheet transport path A and the circumferential rotational path D, the front edges 45 of the clips 44 come closer to the rear end 47 of the case 46, and the gripper 42 grips the front edge of the sheet of paper P. In other words, the start point of the overlap between the sheet transport path A and the circumferential rotational path D is called a start position of holding of the sheet of paper P by the gripper 42 on the circumferential rotational path D. The start position of holding of the sheet of paper P by the gripper 42 on the circumferential rotational path D is called a pass point D1 (=corresponds to an example of a pass point) at which the sheet of paper P is passed from the sheet transport path A to the gripper 42. Requirements for CL. 2

In addition, at the end point of the overlap between the circumferential rotational path D and the sheet transport path A, the front edges 45 of the clips 44 are separated from the rear end 47 of the case 46, and the front edge of the sheet of paper P is released. The position of releasing the sheet of paper P from the gripper 42 on the circumferential rotational path D is called a receiving point D2 (=corresponds to an example of a receiving point) at which the sheet of paper P is received by the sheet transport path A from the gripper 42. Note that the pass point D1 is disposed below the receiving point D2.

As illustrated in FIG. 1, in the exemplary embodiment, when the sheet of paper P is passed from the sheet transport path A to the circumferential rotational path D, the sheet of paper P is passed from the left side to the right side with respect to the image formation position. In other words, the sheet feed direction at the pass point D1 is such that transport is made from the leftward direction to the rightward direction.

In contrast, when the sheet of paper P is received by the circumferential rotational path D, the sheet of paper P is received from the right side to the left side with respect to the second transfer position 18. In other words, the sheet discharge direction at the receiving point D2 is such that transport is made from the rightward direction to the leftward direction.

In another viewpoint of what has been described, the receiving point D2 and the pass point D1 are both provided on the left side (that is, on the same side) in FIG. 1 with respect to the second transfer position 18 on the circumferential rotational path D. In addition, the sheet feed direction and the sheet discharge direction are set to be opposite directions.

In addition, the direction in which the sheet of paper P passes through the second transfer position 18 (that is, the image formation position) on the circumferential rotational path D is provided to be inclined upward from the lower right side to the upper left side.

Of the circumferential rotational path D, the path from the second transfer position 18 to the point passing the fixing device 40 is formed to be inclined upward. Thus, the position of the fixing device 40 is arranged above the position of the second transfer position 18.

Of the circumferential rotational path D, the path from the point passing the fixing device 40 (the receiving point D2) to the merge point (the pass point D1) to the sheet transport path A is formed to be inclined downward. The path inclined downward from the receiving point D2 to the pass point D1 is an inclined section DT. With this configuration, the inclined section DT forms space S which is interposed between the inclined section DT and the sheet transport path A. The space S in the exemplary embodiment has a vertical height which is reduced over a range from the receiving point D2 to the pass point D1 in the horizontal direction. In other words, the space S in the exemplary embodiment has a vertical height which is reduced over a range from the fixing device 40 to the second transfer position 18 in the horizontal direction.

Position Adjuster

As illustrated in FIG. 1, a position adjuster 50 is disposed so that part of the upper side thereof is in the space S, and has a function of making position adjustment to the sheet of paper P transported to the pass point D1. Specifically, the position adjuster 50 is disposed on the merge path provided between the direction change path B and the pass point D1 on the sheet transport path A.

Figure 7:
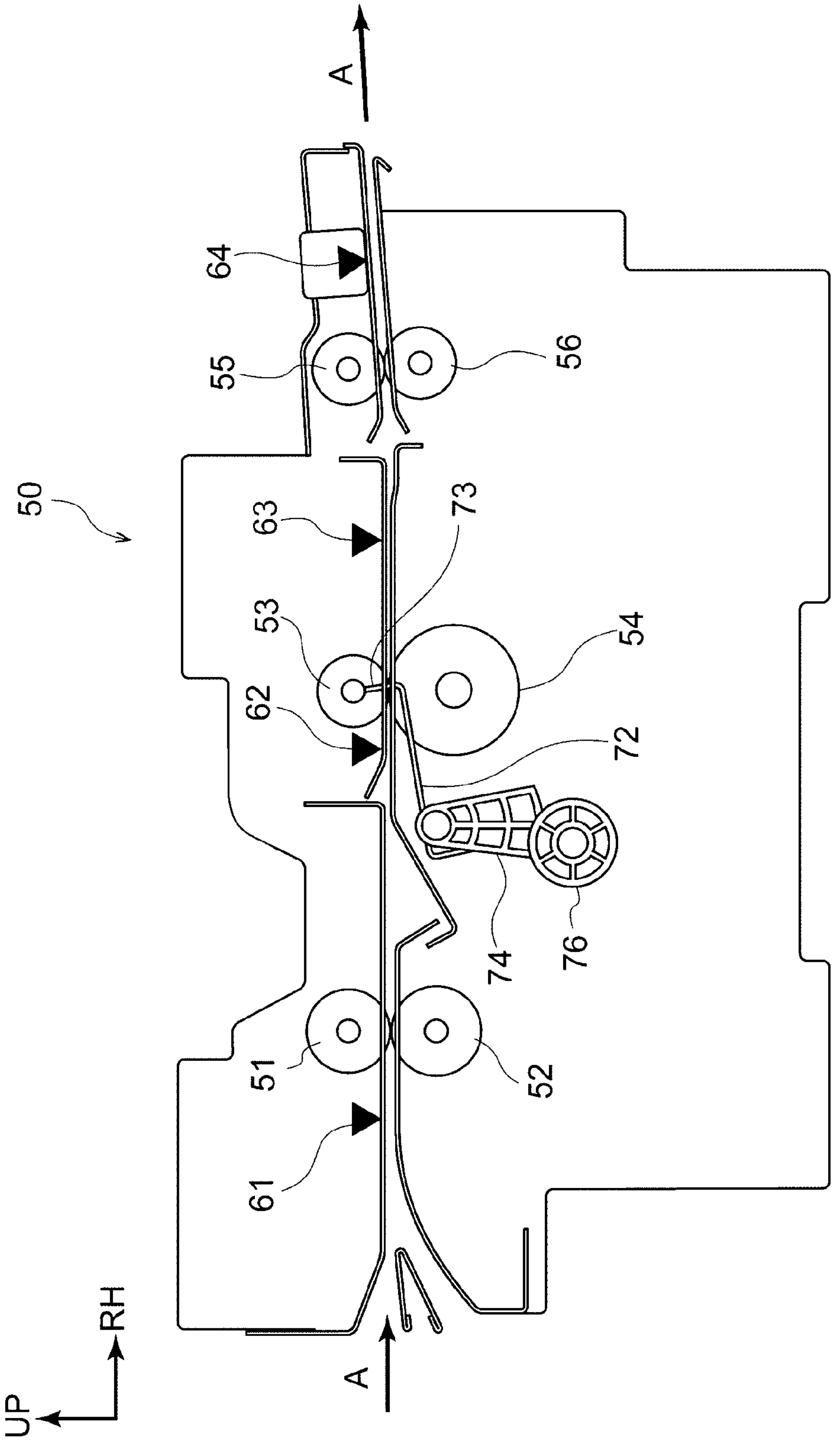
FIG. 7 is an enlarged view illustrating the structure of the position adjuster in the image forming apparatus according to the first exemplary embodiment.

As illustrated in FIG. 7, the position adjuster 50 includes multiple rolls 51 to 56, multiple sensors 61 to 64 and a stopper 72. Each roll is disposed on the upper side or the lower side of the sheet transport path A. Specifically, the roll 51, the roll 53, and the roll 55 are disposed on the upper side of the merge path in sequence in the transport direction of the sheet of paper P In addition, the roll 52, the roll 54, and the roll 56 are disposed on the lower side of the merge path so as to form pairs with the roll 51, the roll 53, and the roll 55, respectively. These roll pairs rotate, thereby transporting the sheet of paper P with the sheet of paper P interposed between each upper-side roll and a corresponding lower-side roll. Note that the roll 54 is provided separably from the sheet transport path A.

A substantially N-shaped stopper 72 is disposed on the near side and the far side in the depth direction at the contact point between the roll 53 and the roll 54. The downstream end of the stopper 72 in the sheet transport direction is a gate section 73 which is bent upward to intersect the sheet transport path A. The front edge P1 of the sheet of paper P supplied to the position adjuster 50 is butted against the gate section 73, thus the timing of sheet transport, positional displacement in the sheet width direction or inclination of the sheet is adjusted. Specifically, the position adjuster 50 makes positional adjustment to the sheet of paper P transported to the pass point D1 by the gate section 73 provided in the pair of the roll 53 and the roll 54.

A sector-shaped gear 74 and a circular gear 76 engaged with the gear 74 are provided at an upstream position of the stopper 72 in the sheet transport direction. Rotation of a motor (not illustrated) mounted on the gear 76 causes the gear 76 and the gear 74 to rotate, and thus the gate section 73 of the stopper 72 mounted on the gear 74 is moved in the up and down direction in FIG. 1.

When the gate section 73 is moved upward, the gate section 73 is transferred to a position to block the sheet transport path A. In this case, the sheet of paper P transported along the sheet transport path A is prevented from being transported at the position of the gate section 73. On the other hand, when the gate section 73 is moved downward, the gate section 73 is transported to a position to allow transport of the sheet transport path A. In this case, the sheet of paper P is transported along the sheet transport path A without receiving interference from the gate section 73.

The sensors 61 to 64 each detect a passing state and a non-passing state of the sheet of paper P transported along the sheet transport path A. The operation of each of the rolls 51 to 56 is controlled as appropriate by the controller 16 which has received a signal from each of the sensors 61 to 64.

Note that the position adjuster 50 is disposed so as to overlap in position with the inclined section DT of the circumferential rotational path D as viewed in the horizontal direction. In other words, the position adjuster 50 is disposed between the fixing device 40 and the second transfer position 18 in the horizontal direction. In addition, the position adjuster 50 is disposed at a position nearer to the pass point D1 than a bisector (its illustration is omitted) in the space S, the bisector dividing the space S into halves, that is, the upstream side and the downstream side in the transport direction to the pass point D1. That is, the rolls 53, 54 are disposed at a position nearer to the pass point D1 than a bisector (its illustration is omitted) in the space S, the bisector dividing the space S into halves, that is, the upstream side and the downstream side in the transport direction to the pass point D1. In other words, the gate section 73 is disposed at a position nearer to the pass point D1 than a bisector (its illustration is omitted) in the space S, the bisector dividing the space S into halves, that is, the upstream side and the downstream side in the transport direction to the pass point Dl. In addition, the position adjuster 50 is disposed in the unit 10A where the image former and the transport chains 49 are arranged. In short, in the image forming apparatus 10, the image former, the transport chains 49 and the position adjuster 50 are disposed in the same unit 10A.

Operation in Position Adjuster

Figure 8:
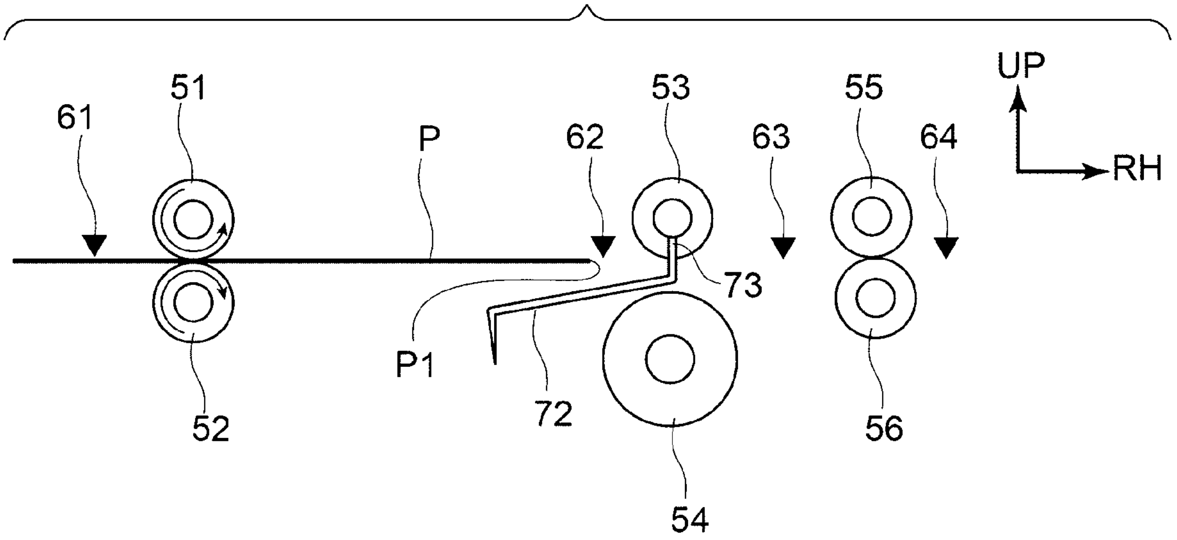
FIG. 8 is an enlarged view illustrating an operation of the position adjuster in the image forming apparatus according to the first exemplary embodiment.

FIG. 8 to FIG. 13 illustrate the operation of each component in the position adjuster 50 when positional adjustment is made to the sheet of paper P. As illustrated in FIG. 8, the gate section 73 is disposed so as to block the sheet transport path when the sheet of paper P is transported.

As illustrated in FIG. 8, the front edge P1 of the sheet of paper P transported along the sheet transport path A passes through the sensor 61. The roll 51 and the roll 52 are driven during the time starting from the timing of sheet passing detected by the sensor 61 until the front edge P1 of the sheet of paper P reaches the gate section 73. Note that whether the front edge P1 of the sheet of paper P reaches the gate section 73 is also predicted by the timing of passing of the front edge P1 detected by the sensor 62 which is provided on the near side of the gate section 73.

Figure 9:
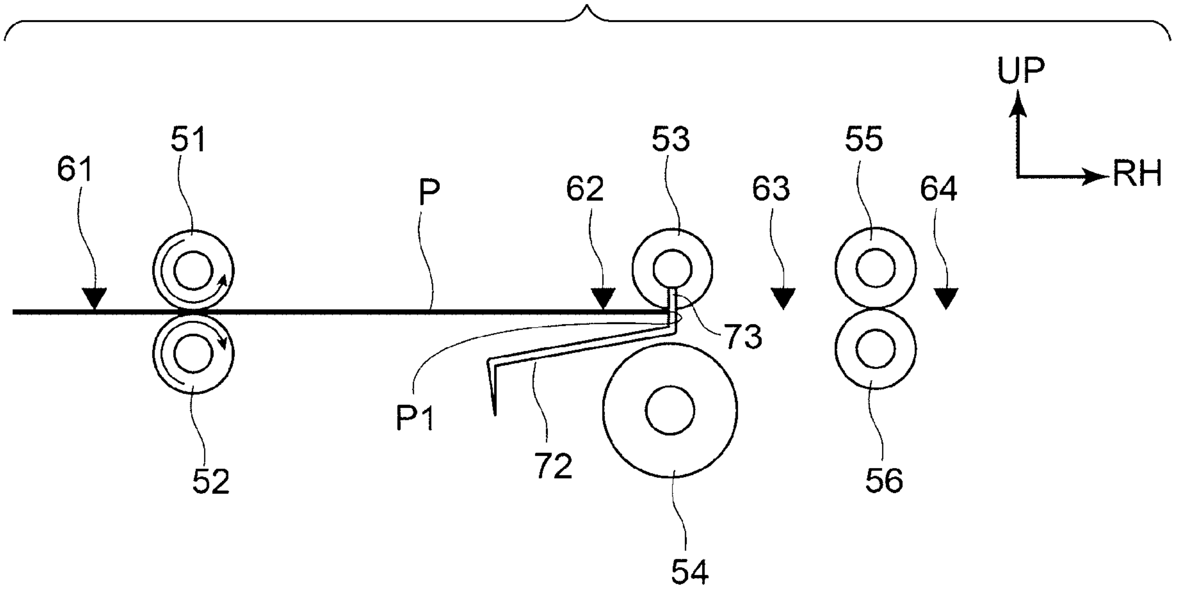
FIG. 9 is an enlarged view illustrating an operation of the position adjuster in the image forming apparatus according to the first exemplary embodiment.

As illustrated in FIG. 9, when the front edge P1 of the sheet of paper P reaches the gate section 73, the roll 53 and the roll 54 are in a state of being apart from each other. Specifically, the lower-side roll 54 provided movably in a vertical direction is in a state of being moved downward. The sheet of paper P with the front edge P1 transported to the gate section 73 is further transported by the roll 51 and the roll 52 for a predetermined time.

Figure 10:
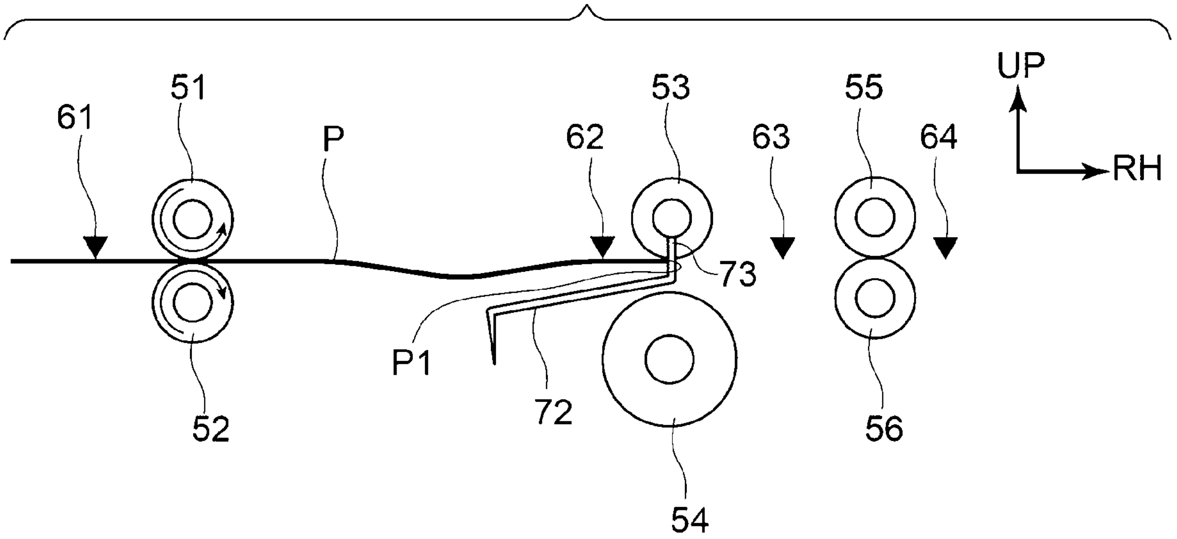
FIG. 10 is an enlarged view illustrating an operation of the position adjuster in the image forming apparatus according to the first exemplary embodiment.

As illustrated in FIG. 10, the sheet of paper P further delivered by the roll 51 and the roll 52 with the front edge P1 butted against the gate section 73 is in a state of bending between the roll 51, the roll 52, and the gate section 73. Thus, inclination of the sheet of paper P in the width direction is corrected by the gate section 73.

Figure 11:
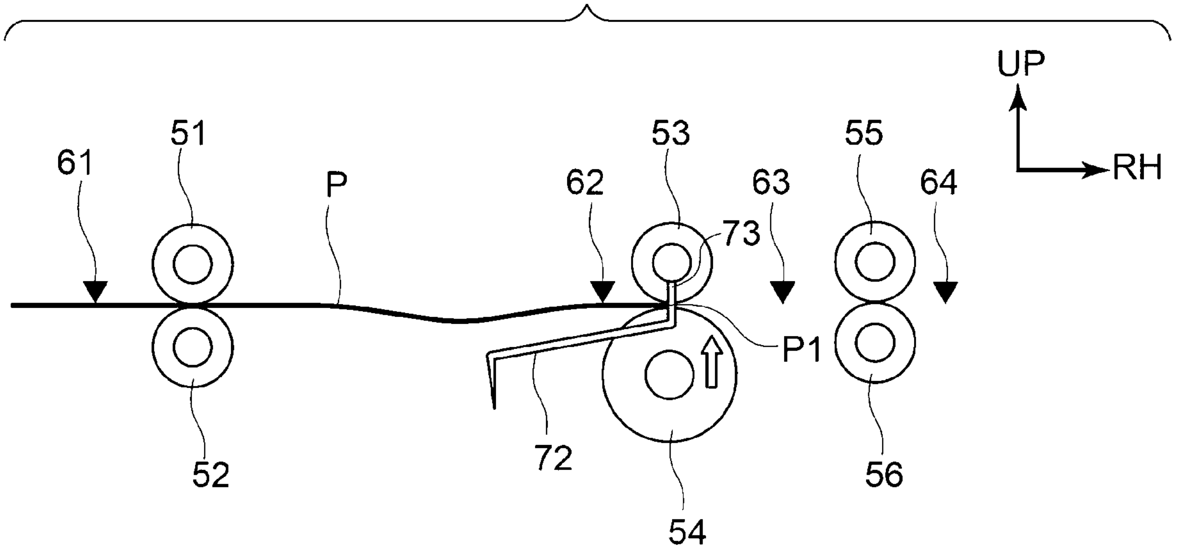
FIG. 11 is an enlarged view illustrating an operation of the position adjuster in the image forming apparatus according to the first exemplary embodiment.

As illustrated in FIG. 11, after the inclination of the sheet of paper P is corrected, the roll 54 is moved upward. Thus, the roll 53 and the roll 54 are in a state of pinching the front edge P1 of the sheet of paper P. At this time, since the inclination of the front edge P1 of the sheet of paper P is corrected by the gate section 73, the state of corrected inclination is maintained by the roll 53 and the roll 54.

Figure 12:
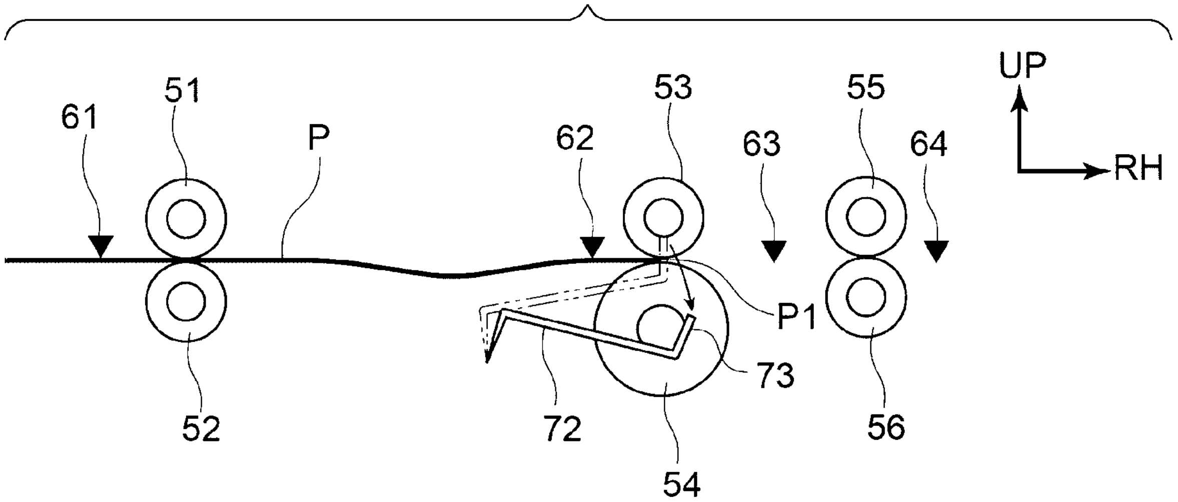
FIG. 12 is an enlarged view illustrating an operation of the position adjuster in the image forming apparatus according to the first exemplary embodiment.

As illustrated in FIG. 12, with the front edge P1 of the sheet of paper P maintained by the roll 53 and the roll 54, the gate section 73 is moved downward. At this time, the roll 53 and the roll 54 are in a stationary state.

Figure 13:
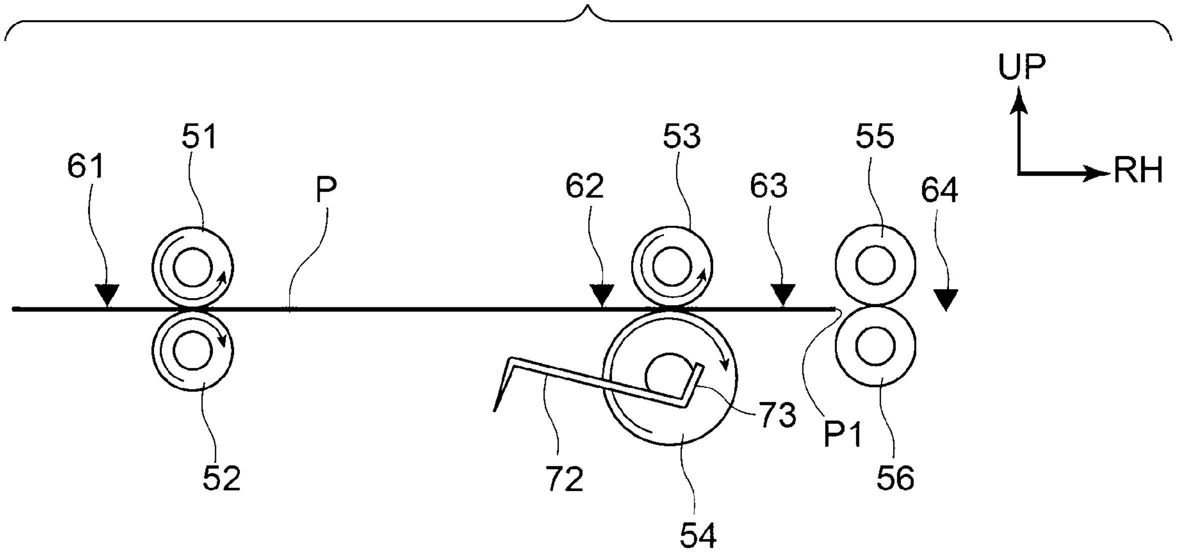
FIG. 13 is an enlarged view illustrating an operation of the position adjuster in the image forming apparatus according to the first exemplary embodiment.

As illustrated in FIG. 13, after the gate section 73 is moved downward, the roll 53 and the roll 54 are driven, thus the sheet of paper P is transported again. The front edge P1 of the transported sheet of paper P passes through the sensor 63 disposed between the roll 53 and the roll 55. The front edge P1 of the sheet of paper P is then supplied to the roll 55 and the roll 56. Furthermore, the front edge P1 of the sheet of paper P is transported by driving the roll 55 and the roll 56. At this time, the sensor 63 and the sensor 64 detect the timing of passing of the front edge P1 of the sheet of paper P, thus the drive state of the roll 55 and the roll 56 is controlled.

Passing of Sheet of Paper

Figure 5:
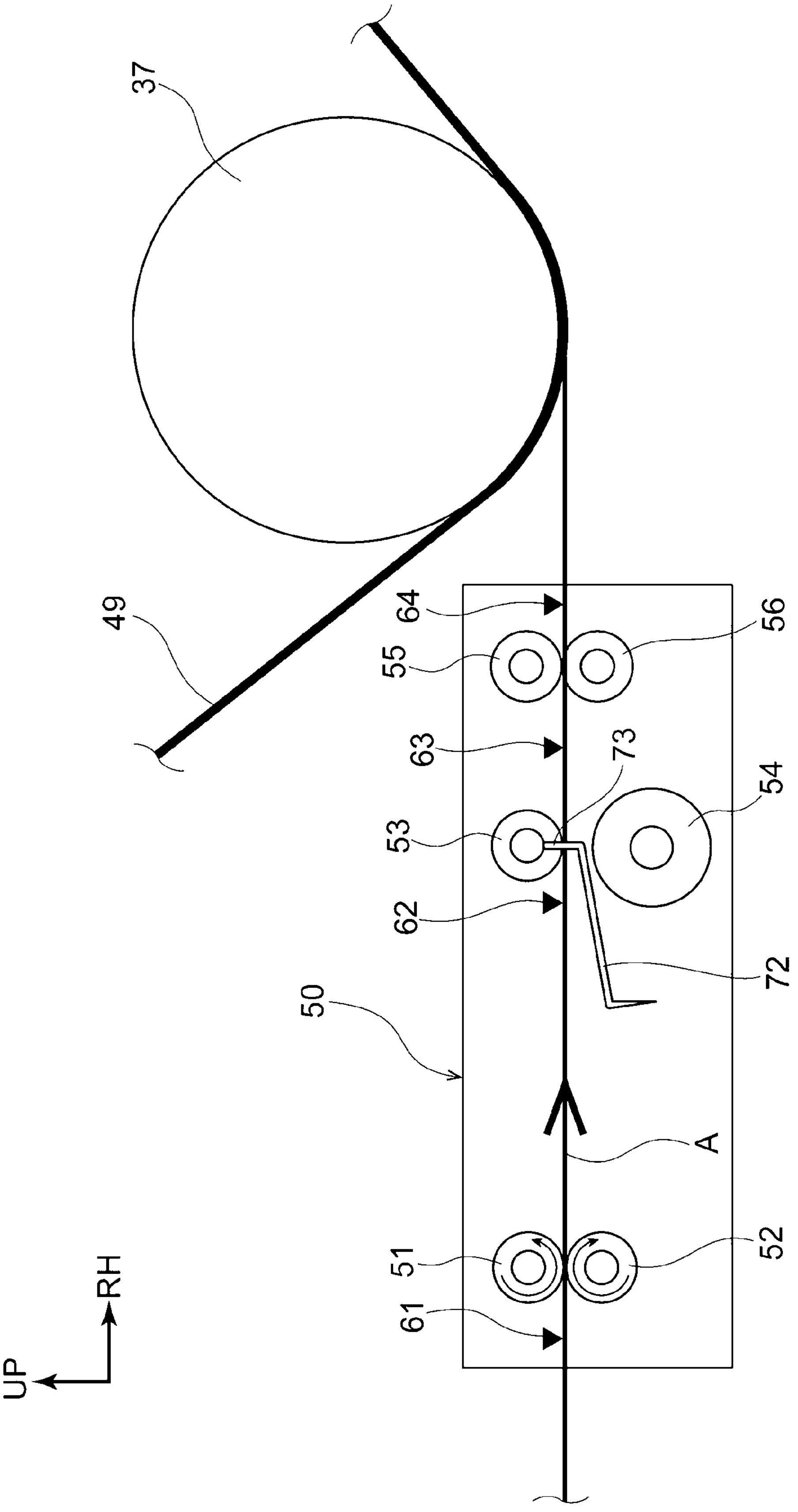
FIG. 5 is an enlarged view illustrating a position adjuster in the image forming apparatus according to the first exemplary embodiment.
Figure 6A:
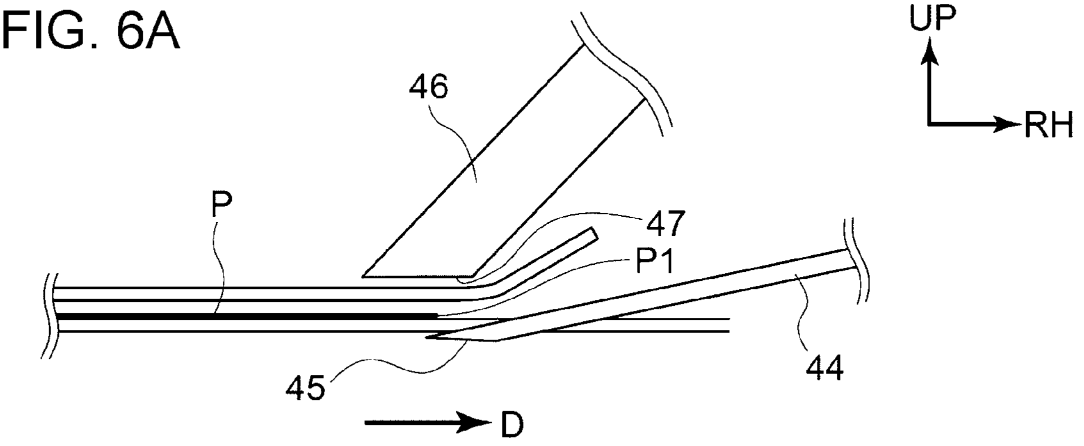
FIGS. 6A to 6C are each an enlarged view illustrating an operation of holding the front edge of a sheet by the gripper in the image forming apparatus according to the first exemplary embodiment.
Figure 6B:
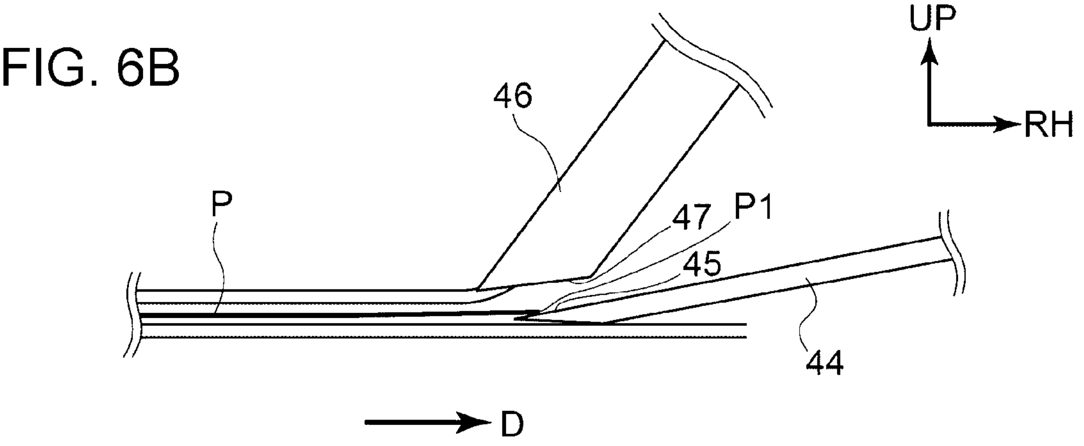
Figure 6C:
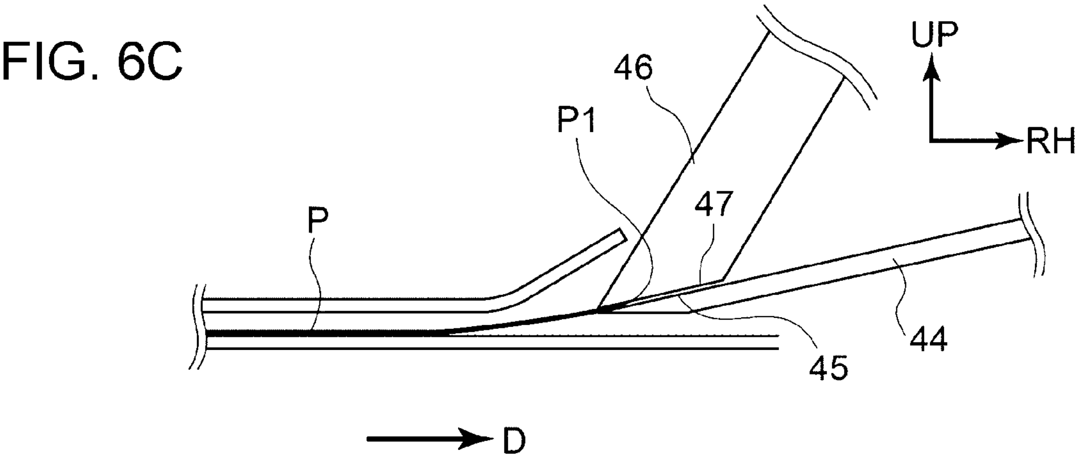

As illustrated in FIGS. 6A to 6C, the sheet of paper P which has passed through the position adjuster 50 is gripped by the rear end 47 of the case 46 and the front edges 45 of the clips 44 in the gripper 42 on the circumference of the sprocket 37 in FIG. 5. The gripper 42 is supplied while being moved along the circumferential rotational path D in synchronization with the timing of transport of the front edge P1 of the sheet of paper P. At this time, as illustrated in FIG. 6A, the case 46 and the clips 44 are in an open state.

As illustrated in FIG. 6B, the gripper 42 is configured to be moved along the circumferential rotational path D in synchronization with the timing of transport of the sheet of paper P, and the gap between the case 46 and the clips 44 is gradually reduced. The front edges 45 of the clips 44 raise the front edge P1 of the sheet of paper P from the sheet transport path A.

As illustrated in FIG. 6C, the front edge P1 of the sheet of paper P is further raised by the clips 44, and is passed from the sheet transport path A to the circumferential rotational path D with the front edge P1 gripped by the rear end 47 of the case 46 and the front edges 45 of the clips 44. Subsequently, the sheet of paper P is transported to the circumferential rotational path D by the gripper 42.

Reversal of Sheet of Paper

As illustrated in FIG. 1, after the sheet of paper P is passed to the circumferential rotational path D, the front and back thereof are reversed along the outer circumference of the transfer body 36. Specifically, the transport chains 49 along the circumferential rotational path D cause the front and back of the sheet of paper P to be reversed on the circumferential rotational path D. The sheet of paper P is then transported to the second transfer position 18 provided on the outer circumference of the transfer body 36. Specifically, the second transfer position 18 is designed so that the sheet of paper P passes through the second transfer position 18 in the process of reversing the sheet of paper P along the circumferential rotational path D and the outer circumference of the transfer body 36. In other words, the transport chains 49 along the circumferential rotational path D pass through the image former in the process of reversing the front and back of the sheet of paper P.

When the sheet of paper P passes through the second transfer position 18, the surface facing the back-up roll 33 is called an image formation surface (=front surface). In other words, the sheet of paper P is transported with the back surface facing upward at the position adjuster 50 and the pass point D1.

Receiving of Sheet of Paper

After passing through the fixing device 40, the sheet of paper P is received by the sheet transport path A from the circumferential rotational path D. The branch point between the circumferential rotational path D and the sheet transport path A is called the receiving point D2 (=an example of a receiving point). The gripper 42 holding the front edge of the sheet of paper P is released at the receiving point D2, thus the sheet of paper P is received by the sheet transport path A from the circumferential rotational path D.

Duplex Printing

At the time of duplex printing, after passing through the receiving point D2 and being received by the sheet transport path A, the sheet of paper P is transported to the direction change path B where the transport direction is changed, then is passed through the merge path, and transported to the sheet transport path A toward the second transfer position 18. At this time, the upper and lower surfaces of the following two sheets of paper P are reversed: one sheet of paper P which has undergone transport direction change made by the direction change path B, and moves toward the second transfer position 18 through the merge path, and the other sheet of paper P which moves from a supply tray 38 toward the second transfer position 18 through the merge path. Specifically, the one sheet of paper P is transported with the front surface facing upward, where the one sheet of paper P has undergone transport direction change made by the direction change path B, and moves toward the second transfer position 18 through the merge path. The sheet of paper P, which has passed through the merge path and is transported to the sheet transport path A toward the second transfer position 18, is passed to the circumferential rotational path D again at the pass point D1. Then the front and back surfaces of the sheet of paper P are reversed along the outer circumference of the transfer body 36, and the sheet of paper P is transported to the second transfer position 18. At this time, the front surface of the sheet of paper P, facing the back-up roll 33 is the rear surface, thus an image is formed on the back surface. In other words, the transport chains 49 along the circumferential rotational path D constitute part of a back surface-side transport path for forming an image on the back surface of the sheet of paper P.

Operations

Next, the operation of the image forming apparatus according to the first exemplary embodiment of the present disclosure will be described.

As illustrated in FIG. 1, in the image forming apparatus 10, the receiving point D2 and the pass point D1 are both provided on the left side (that is, on the same side) with respect to the second transfer position 18 (that is, the image formation position) on the circumferential rotational path D. In this configuration, the overall apparatus can be downsized, as compared with a configuration in which the receiving point D2 and the pass point D1 are provided on different sides with respect to the image formation position.

In addition, in the image forming apparatus 10, the pass point D1 is provided below the receiving point D2. In this configuration, the transport path (that is, the sheet discharge path) leading to the sheet discharge tray 39 provided downstream of the pass point D1 on the sheet transport path A is likely to be disposed above the transport path (that is, the sheet feed path) provided from the sheet trays 38 in the image forming apparatus 10. In this configuration, when the sheet discharge tray 39 is disposed at a high position in the image forming apparatus 10, and the sheet trays 38 are disposed at a low position, a height adjustment transport path for adjustment of the above transport paths is unnecessary.

In addition, the circumferential rotational path D of the image forming apparatus 10 is provided so that the direction of passing of the sheet of paper P through the second transfer position 18 (that is, the image formation position) is inclined upward from the lower right side to the upper left side. Thus, the overall apparatus in the horizontal direction can be downsized, as compared with when the passage direction of the sheet of paper P is set to the horizontal direction. More particularly, the members provided at the second transfer position 18 can be disposed in a diagonal direction, thus the horizontal width of the members can be made shorter than the transport distance of the relevant members. In this configuration, even when a transfer belt transfer device or an ink jet image former is disposed at the second transfer position 18, due to a similar reason, the length of the overall device in the horizontal direction can be made shorter than the transport distance of the recording medium.

In the image forming apparatus 10, the position of the fixing device 40 is placed above the second transfer position 18. In this configuration, the heat generated in the fixing device 40 is unlikely to be transmitted to the second transfer position 18, as compared with a configuration in which the fixing device 40 is disposed below the second transfer position 18. In addition, in this configuration, a longer distance of the transport path can be ensured with respect to the horizontal distance of the transport path between the second transfer position 18 and the fixing device 40. Thus, the space to arrange a preliminary fixing device for performing preliminary fixing, and a neutralization device for performing a neutralization process to improve image quality can be ensured between the second transfer position 18 and the fixing device 40.

In the image forming apparatus 10, the position adjuster 50 is disposed between the fixing device 40 and the second transfer position 18 in the horizontal direction. Thus, in the image forming apparatus 10, the overall apparatus in the horizontal direction can be downsized, as compared with when the position adjuster 50 is disposed outside the range between the fixing device 40 and the second transfer position 18 in the horizontal direction.

In the image forming apparatus 10, the image former, the transport chains 49 and the position adjuster 50 are disposed in the same unit 10A. In a comparative example in which the position adjuster 50 is disposed in the unit 10B, for adjustment of the position adjuster 50 accompanying installation of the image forming apparatus 10, the adjustment needs to be made in consideration of the accuracy of installation of the unit 10B with respect to the unit 10A. In contrast, in the image forming apparatus 10, the image former, the transport chains 49 and the position adjuster 50 are disposed in the same unit 10A, thus for adjustment of the position adjuster 50, it is not necessary to consider the accuracy of installation of the unit 10B with respect to the unit 10A. Thus, in the image forming apparatus 10, the adjustment of the position adjuster 50 at the time of installation of the image forming apparatus 10 can be simplified, as compared with the above-mentioned comparative example.

In the image forming apparatus 10, the circumferential rotational path D has the inclined section DT which is inclined downward from the receiving point D2 to the pass point Dl. The image forming apparatus 10 has a configuration in which the position adjuster 50 is disposed in the space S interposed between the inclined section DT and the sheet transport path A. In this configuration, the distance between the position adjuster 50 and the pass point D1 is reduced, as compared with a configuration in which the position adjuster 50 is disposed upstream of the space S in the transport direction of the sheet of paper P. In this manner, the shorter the distance between the position adjuster 50 and the pass point D1, the lower the possibility of occurrence of error in the accuracy of sheet transport. Thus, in the image forming apparatus 10, the positional accuracy of the sheet of paper P transported to the pass point D1 is increased, as compared with a configuration in which the position adjuster 50 is disposed upstream of the space S in the transport direction of the sheet of paper P. Thus, in the image forming apparatus 10, the accuracy of position for holding the sheet of paper P by the gripper 42 is improved, as compared with a configuration in which the position adjuster 50 is disposed upstream of the space S in the transport direction of the sheet of paper P.

The image forming apparatus 10 has a configuration in which the transport chains 49 are mounted on both axial ends of the gripper 42. Thus, inclination of the recording medium in the width direction can be reduced, as compared with a configuration in which a transport chain 49 is mounted only on a central portion of the gripper 42 in the axial direction.

The image forming apparatus 10 has a configuration in which the transport chains 49 along the circumferential rotational path D cause the front and back of the sheet of paper P to be reversed on the circumferential rotational path D. In this configuration, the overall apparatus can be downsized, as compared with a configuration in which a path that causes the front and back of the sheet of paper P to be reversed is provided separately from the circumferential rotational path D.

The image forming apparatus 10 has a configuration in which the transport chains 49 along the circumferential rotational path D pass through the image former in the process of reversing the front and back of the sheet of paper P. In this configuration, the overall apparatus can be downsized, as compared with a configuration in which a front and back of sheet reversal path is provided separately from the circumferential rotational path D (that is, part of the sheet transport path A).

In the image forming apparatus 10, the transport chains 49 along the circumferential rotational path D configurates part of a back surface-side transport path for forming an image on the back surface of the sheet of paper P. In this configuration, the overall apparatus can be downsized, as compared with a configuration in which the circumferential rotation unit and the back surface-side transport path are separately provided.

In the image forming apparatus 10, the position adjuster 50 is disposed in the merge path provided between the direction change path B and the pass point D1 on the sheet transport path A. In this configuration, the overall apparatus can be downsized, as compared with a configuration in which the merge path and the position adjuster 50 are separately provided. In this configuration, positional adjustment at the time of front surface transport of the sheet of paper P and positional adjustment at the time of back surface transport can be made by the position adjuster 50 in common. In other words, in the image forming apparatus 10, the position adjuster 50 serves as both a position adjuster for front surface transport and a position adjuster for back surface transport. Thus, in this configuration, the overall apparatus can be downsized, as compared with a configuration in which a position adjuster for front surface transport and a position adjuster for back surface transport are separately provided.

Second Exemplary Embodiment

Next, an image forming apparatus 110 according to a second exemplary embodiment of the present disclosure will be described with reference to FIG. 14. The image forming apparatus 110 according to the second exemplary embodiment is a modification of the image forming apparatus according to the first exemplary embodiment, thus a redundant content is labeled with the same or a related number as appropriate, and a description is omitted.

Figure 14:
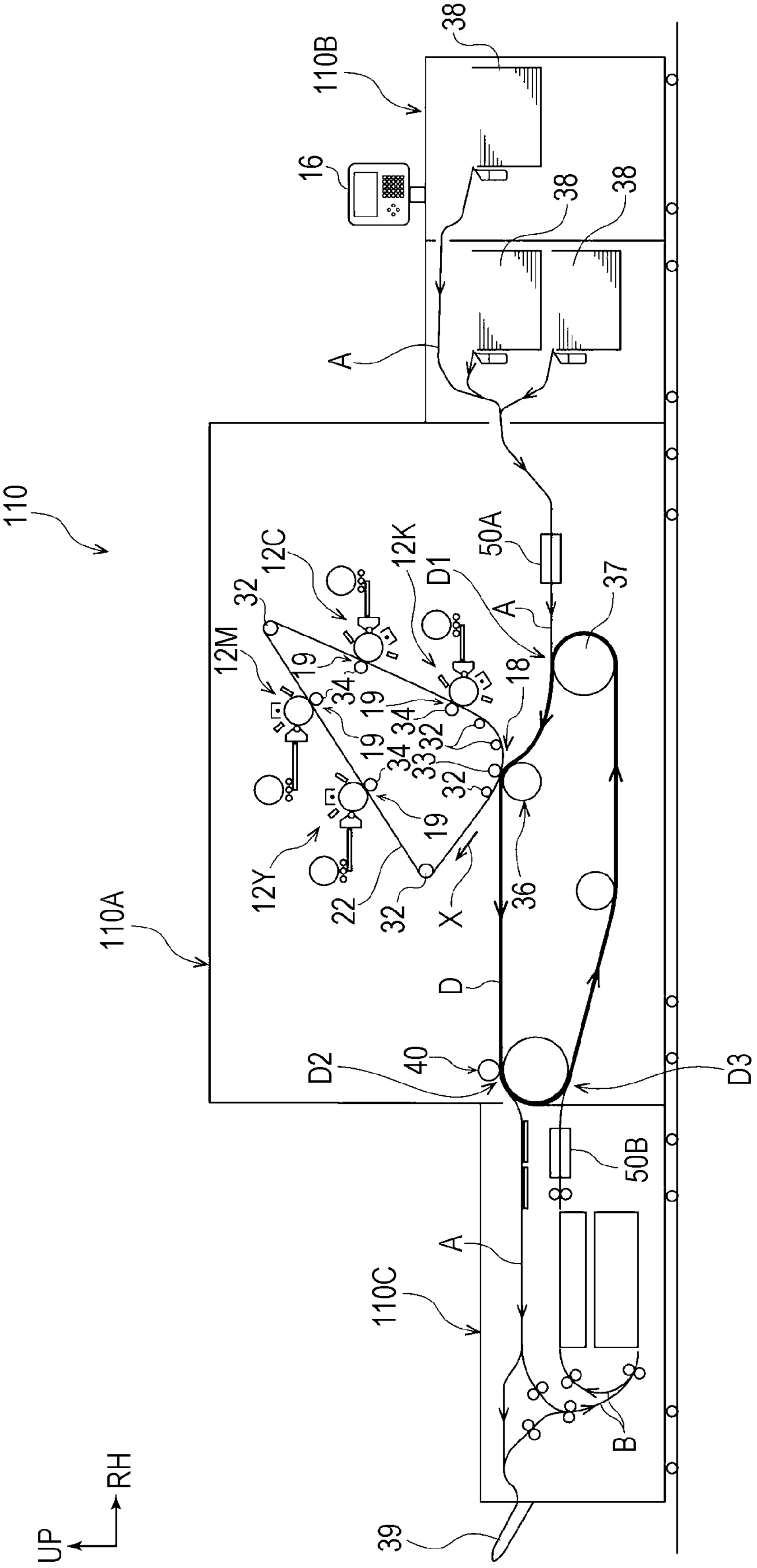
FIG. 14 is a front view illustrating an image forming apparatus according to a second exemplary embodiment.

As illustrated in FIG. 14, the image forming apparatus 110 includes: a unit 110A disposed at the center in the right and left direction of FIG. 14; a unit 110B disposed on the right side; and a unit 110C disposed on the left side.

Sheet Transport Path

The sheet transport path A in the image forming apparatus 110 is configured to pass through the unit 110B, the unit 110A, and the unit 10C sequentially. Thus, the sheet of paper P transported along the sheet transport path A is supplied from a sheet tray 38 disposed in the unit 110B and discharged to the unit 110C through the unit 110A.

Here, in the exemplary embodiment, the image formation surface of a sheet of paper P is the upper surface side when the sheet is stored in a sheet tray 38. In other words, the sheet of paper P in a state of being stored in the sheet tray 38 is transported to the second transfer position 18 without being reversed.

On the other hand, at the time of duplex printing, when an image is formed on the back surface-side of the image formation surface of the sheet of paper P, the sheet of paper P is transported along the direction change path B provided in the unit 110C and the unit 110A, and after the transport direction is changed, the sheet of paper P is supplied to the circumferential rotational path D again. Thus, the direction change path B and the circumferential rotational path D constitute a back surface-side transport path for forming an image on the back surface of the sheet of paper P. In other words, the circumferential rotational path D constitutes part of the back surface-side transport path.

Circumferential Rotational Path

The circumferential rotational path D of the image forming apparatus 110 is disposed in the right and left direction in FIG. 14 with respect to the second transfer position 18. At the time of front surface transport of the sheet of paper P, the pass point D1 at which the sheet of paper P is passed from the sheet transport path A to the circumferential rotational path D is disposed on the right side in FIG. 14 with respect to the second transfer position 18. In addition, the receiving point D2 at which the sheet of paper P is received by the sheet transport path A from the circumferential rotational path D is disposed on the left side in FIG. 14 with respect to the second transfer position 18. In contrast, at the time of back surface transport of the sheet of paper P, a re-receiving point D2 at which the sheet of paper P is passed again from the direction change path B to the circumferential rotational path D is disposed on the left side in FIG. 14 with respect to the second transfer position 18.

Position Adjuster

The image forming apparatus 110 includes a position adjuster 50A and a position adjuster 50B. The position adjuster 50A is disposed upstream in the sheet transport direction relative to a merge position from the sheet transport path A to the circumferential rotational path D. In contrast, the position adjuster 50B is disposed upstream in the sheet transport direction relative to a merge position from the direction change path B to the circumferential rotational path D.

The position adjuster 50A is in charge of position adjustment at the time of transport for image formation on the front surface of the sheet of paper P. In contrast, the position adjuster 50B is in charge of position adjustment at the time of transport for image formation on the back surface of the sheet of paper P.

Operational Effect

Hereinafter, the operational effect of the image forming apparatus 110 according to the second exemplary embodiment of the present disclosure will be described.

As illustrated in FIG. 14, in the image forming apparatus 110, when an image is formed on the front surface of the sheet of paper P, then an image is formed on the back surface, the front and back of the sheet of paper P are reversed at the right end of the circumferential rotational path D. That is, the circumferential rotational path D includes part of the transport path for back surface-side of the sheet of paper. In this configuration, the overall apparatus can be downsized, as compared with a configuration in which the transport path for back surface-side of the sheet of paper and the circumferential rotational path D are separately provided.

In the image forming apparatus 110, the sprocket 37 is disposed on the right side in FIG. 14 with respect to the second transfer position 18 so that an image is formed in the process of reversing the front and back of the sheet of paper on the circumferential rotational path D. In this configuration, the overall apparatus can be downsized, as compared with a configuration in which a front and back of sheet reversal path is provided separately from the circumferential rotational path D (that is, part of the sheet transport path A).

In the image forming apparatus 110, the pass point D1 is disposed below the receiving point D2. In this configuration, when the sheet discharge tray 39 is disposed at a high position in the image forming apparatus 110, and the sheet trays 38 are disposed at a low position, a height adjustment transport path for unnecessary adjustment of the above transport paths can be eliminated.

Other Aspects

Although the image forming apparatus according to each of the exemplary embodiments has been described, the present disclosure may be implemented in various aspects in a range not departing from the gist of the present disclosure.

For example, in the exemplary embodiments, a system of image formation on a sheet of paper P has been explained using an electrophotographic system as an example. However, without being limited to this, for example, an ink jet system and an offset printing system may be used.

In the exemplary embodiments, the sheet transport direction and the layout of the components are each an example, and may be changed as appropriate. For example, in the exemplary embodiments, the sheet transport path A may be laid out with the right and left directions reversed.

In addition, the sheet trays 38 that supply a sheet of paper P to the sheet transport path A may be provided on both right and left sides of the unit 10A or 110A which includes the image former.

In the exemplary embodiments described above, the gripper 42 has been illustrated to physically hold the front edge of a sheet of paper. However, without being limited to this structure, the gripper 42 may hold the front edge of the sheet of paper P by an air suction power, for example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
- a gripper configured to grip a recording medium;
- transport chains configured to circumferentially rotate with the gripper fixed to the transport chains,
  - wherein the transport chains comprise part of a transport path configured to transport the recording medium;
- an image former configured to form an image on the recording medium at an image formation position on a circumferential rotational path of the transport chains;
- a pass point at which the recording medium may be passed to the circumferential rotational path; and
- a receiving point which is provided on a same side as the pass point with respect to the image formation position,
- wherein the gripper is configured to start gripping the recording medium at the pass point,
- wherein the gripper is configured to stop the gripping of the recording medium at the receiving point,
- wherein the circumferential rotational path is configured to pass through a fixing unit configured to fix an image to the recording medium at a fixing position provided downstream of the image former, and
- wherein the fixing position is above the image formation position on the circumferential rotational path.

2. An image forming apparatus comprising:
- a gripper configured to grip a recording medium;
- transport chains configured to circumferentially rotate with the gripper fixed to the transport chains,
  - wherein the transport chains comprise part of a transport path configured to transport the recording medium;
- an image former configured to form an image on the recording medium at an image formation position on a circumferential rotational path of the transport chains;
- a pass point at which the recording medium may be passed to the circumferential rotational path; and a receiving point which is provided on a same side as the pass point with respect to the image formation position,
wherein the gripper is configured to start gripping the recording medium at the pass point,
wherein the gripper is configured to stop the gripping of the recording medium at the receiving point,
wherein the pass point is below the receiving point,
wherein the circumferential rotational path is configured to pass through a fixing unit configured to fix an image to the recording medium at a fixing position provided downstream of the image former, and
wherein the fixing position is above the image formation position on the circumferential rotational path.

3. An image forming apparatus comprising:
a gripper configured to grip a recording medium;
transport chains configured to circumferentially rotate with the gripper fixed to the transport chains,
wherein the transport chains comprise part of a transport path configured to transport the recording medium;
an image former configured to form an image on the recording medium at an image formation position on a circumferential rotational path of the transport chains;
a pass point at which the recording medium may be passed to the circumferential rotational path; and
a receiving point which is provided on a same side as the pass point with respect to the image formation position,
wherein the gripper is configured to start gripping the recording medium at the pass point,
wherein the gripper is configured to stop the gripping of the recording medium at the receiving point,
wherein the circumferential rotational path is configured to include an upwardly inclined path along which the recording medium may pass through the image former,
wherein the circumferential rotational path is configured to pass through a fixing unit configured to fix an image to the recording medium at a fixing position provided downstream of the image former, and
wherein the fixing position is above the image formation position on the circumferential rotational path.

4. An image forming apparatus comprising:
a gripper configured to grip a recording medium;
transport chains configured to circumferentially rotate with the gripper fixed to the transport chains,
wherein the transport chains comprise part of a transport path configured to transport the recording medium;
an image former configured to form an image on the recording medium at an image formation position on a circumferential rotational path of the transport chains;
a pass point at which the recording medium may be passed to the circumferential rotational path; and
a receiving point which is provided on a same side as the pass point with respect to the image formation position,
wherein the gripper is configured to start gripping the recording medium at the pass point,
wherein the gripper is configured to stop the gripping of the recording medium at the receiving point,
wherein the pass point is below the receiving point,
wherein the circumferential rotational path is configured to include an upwardly inclined path along which the recording medium may pass through the image former,
wherein the circumferential rotational path is configured to pass through a fixing unit configured to fix an image to the recording medium at a fixing position provided downstream of the image former, and
wherein the fixing position is above the image formation position on the circumferential rotational path.

5. The image forming apparatus according to claim 1, wherein a position adjuster configured to perform position adjustment on the recording medium is below the fixing position on the transport path, and between the fixing position and the image formation position in a horizontal direction, and
wherein the position adjuster comprises multiple rolls.

6. The image forming apparatus according to claim 2, wherein a position adjuster configured to perform position adjustment on the recording medium is below the fixing position on the transport path, and between the fixing position and the image formation position in a horizontal direction, and
wherein the position adjuster comprises multiple rolls.

7. The image forming apparatus according to claim 3, wherein a position adjuster configured to perform position adjustment on the recording medium is below the fixing position on the transport path, and between the fixing position and the image formation position in a horizontal direction, and
wherein the position adjuster comprises multiple rolls.

8. The image forming apparatus according to claim 4, wherein a position adjuster configured to perform position adjustment on the recording medium is below the fixing position on the transport path, and between the fixing position and the image formation position in a horizontal direction, and
wherein the position adjuster comprises multiple rolls.

9. An image forming apparatus comprising:
a gripper configured to grip a recording medium;
transport chains configured to circumferentially rotate with the gripper fixed to the transport chains,
wherein the transport chains comprise part of a transport path configured to transport the recording medium;
an image former configured to form an image on the recording medium at an image formation position on a circumferential rotational path of the transport chains;
a pass point at which the recording medium may be passed to the circumferential rotational path; and
a receiving point which is provided on a same side as the pass point with respect to the image formation position,
wherein the gripper is configured to start gripping the recording medium at the pass point,
wherein the gripper is configured to stop the gripping of the recording medium at the receiving point,
wherein the image forming apparatus further comprises a position adjuster configured to perform position adjustment on the recording medium,
wherein the position adjuster comprises multiple rolls,
wherein the image forming apparatus comprises a plurality of units, and
wherein the image former, the transport chains, and the position adjuster are provided in a same unit.

10. An image forming apparatus comprising:
a gripper configured to grip a recording medium;
transport chains configured to circumferentially rotate with the gripper fixed to the transport chains,
wherein the transport chains comprise part of a transport path configured to transport the recording medium;
an image former configured to form an image on the recording medium at an image formation position on a circumferential rotational path of the transport chains;

a pass point at which the recording medium may be passed to the circumferential rotational path; and a receiving point which is provided on a same side as the pass point with respect to the image formation position, wherein the gripper is configured to start gripping the recording medium at the pass point, wherein the gripper is configured to stop the gripping of the recording medium at the receiving point, wherein the pass point is below the receiving point, wherein the image forming apparatus further comprises a position adjuster configured to perform position adjustment on the recording medium, wherein the position adjuster comprises multiple rolls, wherein the image forming apparatus comprises a plurality of units, and wherein the image former, the transport chains, and the position adjuster are provided in a same unit.

11. The image forming apparatus according to claim 9, wherein the circumferential rotational path has an inclined section which is inclined downward from the receiving point to the pass point, a space is formed between the inclined section and the transport path toward the pass point, and wherein the position adjuster is provided in the space.

12. The image forming apparatus according to claim 1, wherein the transport chains are mounted on both ends of the gripper in a width direction of the recording medium being transported.

* * * * *